(12) United States Patent
Dick et al.

(10) Patent No.: US 7,944,934 B2
(45) Date of Patent: May 17, 2011

(54) EFFICIENT MEMORY ALLOCATION IN A WIRELESS TRANSMIT/RECEIVER UNIT

(75) Inventors: Stephen G. Dick, Nesconset, NY (US); Stephen E. Terry, Northport, NY (US); Yi-Ju Chao, Minnetonka, MN (US)

(73) Assignee: InterDigital Technology Corporation, Wilmington, DE (US)

( * ) Notice: Subject to any disclaimer, the term of this patent is extended or adjusted under 35 U.S.C. 154(b) by 1624 days.

(21) Appl. No.: 10/637,827

(22) Filed: Aug. 8, 2003

(65) Prior Publication Data
US 2004/0114593 A1 Jun. 17, 2004

Related U.S. Application Data

(60) Provisional application No. 60/402,826, filed on Aug. 9, 2002.

(51) Int. Cl.
*H04L 12/28* (2006.01)
(52) U.S. Cl. ........ 370/412; 370/342; 370/394; 370/469; 370/474
(58) Field of Classification Search .................. None
See application file for complete search history.

(56) References Cited

U.S. PATENT DOCUMENTS

| 7,020,113 | B2 | 3/2006 | Lee et al. | |
| 2002/0001314 | A1* | 1/2002 | Yi et al. ........................ | 370/469 |
| 2002/0009067 | A1 | 1/2002 | Sachs et al. | |
| 2002/0021698 | A1* | 2/2002 | Lee et al. ....................... | 370/394 |
| 2002/0154612 | A1* | 10/2002 | Massie et al. ................. | 370/329 |
| 2003/0007510 | A1* | 1/2003 | Yeo et al. ....................... | 370/469 |
| 2003/0016698 | A1 | 1/2003 | Chang et al. | |
| 2003/0039270 | A1 | 2/2003 | Chang et al. | |
| 2003/0063598 | A1 | 4/2003 | Huo | |
| 2004/0181635 | A1* | 9/2004 | Huras et al. ................... | 711/151 |
| 2008/0137564 | A1* | 6/2008 | Herrmann ..................... | 370/310 |

FOREIGN PATENT DOCUMENTS

| EP | 1 024 619 | 8/2000 |
| EP | 1 211 868 | 6/2002 |
| KR | 2002-0055227 | 7/2002 |
| WO | 02/054700 | 7/2002 |

OTHER PUBLICATIONS

Third Generation Partnership Project, "Technical Specification Group Radio Access Network; UE Radio Access Capabilities (Release 1999)," 3GPP TS 25.306 V 3.6.0 (Jun. 2002).
Third Generation Partnership Project, "Technical Specification Group Radio Access Network; UE Radio Access Capabilities (Release 1999)," 3GPP TS 25.306 V 3.8.0 (Jun. 2003).
Third Generation Partnership Project, "Technical Specification Group Radio Access Network; UE Radio Access Capabilities (Release 4)," 3GPP TS 25.306 V4.5.0 (Jun. 2002).
Third Generation Partnership Project, "Technical Specification Group Radio Access Network; UE Radio Access Capabilities (Release 4)," 3GPP TS 25.306 V4.7.0 (Jun. 2003).

(Continued)

*Primary Examiner* — Duc C Ho
(74) *Attorney, Agent, or Firm* — Volpe and Koenig, P.C.

(57) ABSTRACT

The present invention allows for effective sharing of the hardware memory of a wireless transmit receive unit (WTRU). The memory will be shared among various buffers of different entities. More particularly, memory will be shared among the MAC reordering buffers and the RLC reception buffers.

4 Claims, 6 Drawing Sheets

OTHER PUBLICATIONS

Third Generation Partnership Project, "Technical Specification Group Radio Access Network; UE Radio Access Capabilities (Release 5)," 3GPP TS 25.306 V5.1.0 (Jun. 2002).

Third Generation Partnership Project, "Technical Specification Group Radio Access Network; UE Radio Access Capabilities (Release 5)," 3GPP TS 25.306 V5.5.0 (Jun. 2003).

* cited by examiner

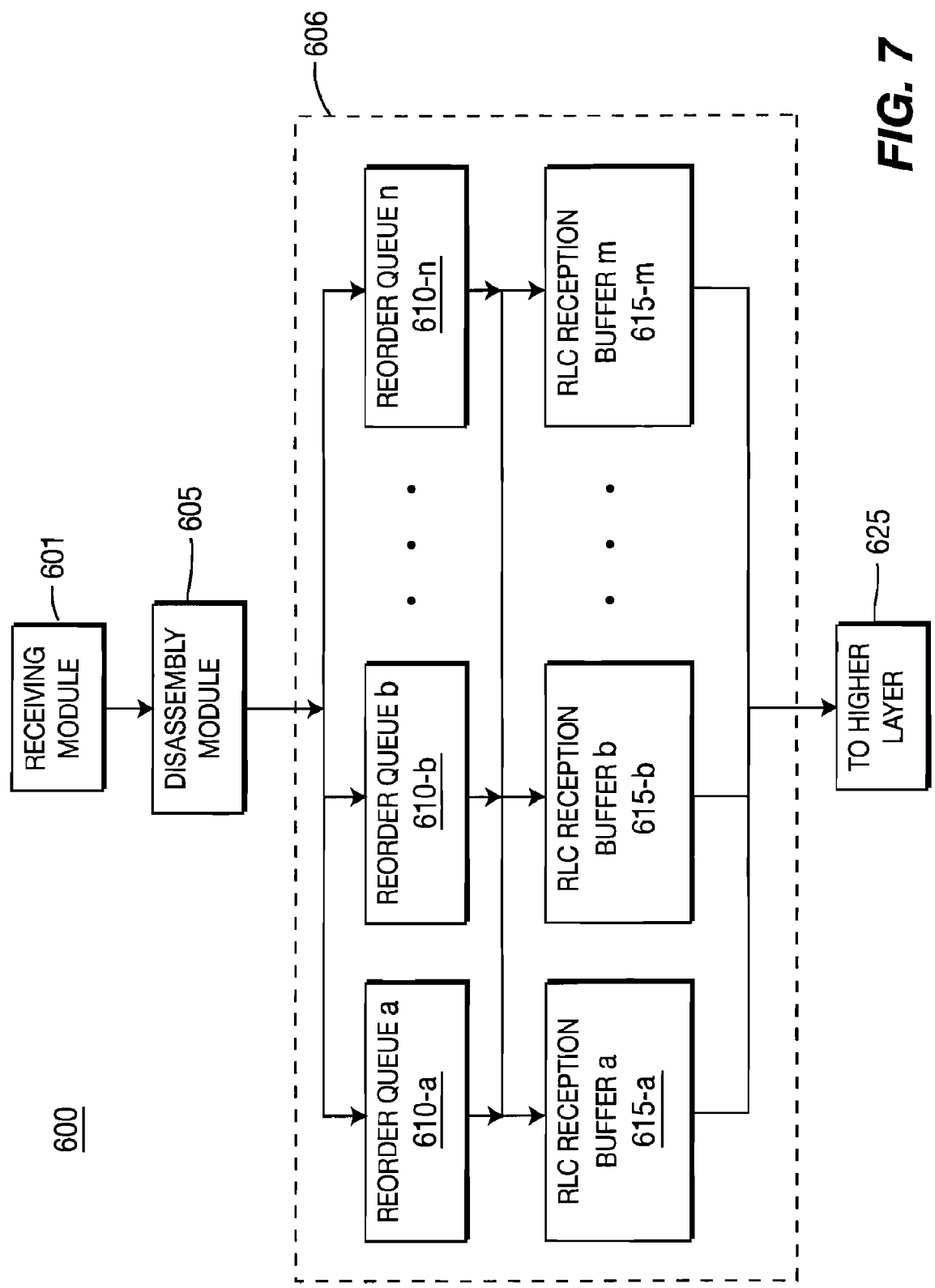

EFFICIENT MEMORY ALLOCATION IN A WIRELESS TRANSMIT/RECEIVER UNIT

CROSS REFERENCE TO RELATED APPLICATION

This application claims priority from U.S. Provisional Application No. 60/402,826, filed on Aug. 9, 2002, which is incorporated by reference as if fully set forth.

BACKGROUND

In many current wireless communication systems, the radio interface is divided into three separate protocol layers as illustrated in FIG. 1. This type of interface is utilized for example, in a third generation partnership project (3GPP) Universal Mobile Telecommunication System (UMTS) Terrestrial Radio Access (UTRA) system. As shown in a wireless transmit/receive unit (WTRU) 5, the protocol layers are a physical layer (L1) 15, a data link layer (L2) 7 and a network layer (L3). The network layer includes a radio resource control unit (RRC) 9. The data link layer 7 comprises a radio link control (RLC) sub-layer 11, a media access control (MAC) sub-layer 13, a packet data convergence protocol (PDCP) layer 6 and a broadcast multicast control (BMC) layer 8.

Some of the physical signaling channels between layers are also labeled. For example, a logical channel 12 is a data transport mechanism between the RLC layer 11 and the MAC layer 13. The logical channel 12 defines the type of data transferred between the two protocol layers. A transport channel 14 is the data transport mechanism between the MAC layer 13 and the physical layer 15. It defines how, and with what characteristics, the data is transferred between the two layers 13, 15. A physical channel 16 is the data transport mechanism sent over the air interface 1 between the physical layer 15 of the WTRU 5 and a peer physical layer 25 in a Node B 17, and defines the physical characteristics of the radio channel.

The Node B 17 has matching protocol peer layers which communicate with their peer layers in the WTRU 5. For example, the Node B 17 has a peer physical layer 25, a peer MAC layer 23, a peer RLC layer 21 and a peer RRC unit 19.

In operation, data is received in the WTRU 5 over the physical channel 16. The physical layer 15 receives the data and forwards transport blocks (TBs) from the physical layer 15 to the MAC layer 13. The TBs are processed by the MAC layer 13 and then by the RLC layer 11 for ultimate processing by the RRC layer 9.

Each layer has it own unique needs for buffering the data. For example, the RLC layer 11 requires reception buffers to support the acknowledged mode (AM) for requesting retransmission of missing blocks and re-sequencing out-of-sequence blocks. The MAC layer 13 also requires buffers for reordering out-of-sequence blocks.

As understood by those of skill in the art, an RLC protocol data unit (PDU) is typically referred to as an acknowledged mode data protocol data unit (AMD PDU) in the context of the AM. In the foregoing description, the terminology RLC PDU is intended to include both RLC PDUs and AMD PDUs, and they may be referred to interchangeably for the purpose of the application.

An example of the use of buffers in the MAC layer 13 for hybrid automatic repeat request (H-ARQ) processing for a WTRU 5 will be described with reference to FIG. 2. Transport block sets (TBS) 24 are utilized to transport data packets. Each TBS has a unique transmission sequence number (TSN). For example, the TBSs of FIG. 2 are each uniquely numbered TSN-24.1 through TSN-24.N and are input to the H-ARQ entity 26.

Due to the nature of the H-ARQ process, the TBSs may be received out-of-sequence or may even be missing. Therefore, TBS TSN-24.3, (which was sent third), arrives before TBS TSN-24.2 (which was sent second); and TBS TSN-24.4 is missing. Based upon the TSNs, the H-ARQ entity 26 detects out-of-sequence and missing TBSs and requests retransmission of the missing TBS. The output of the H-ARQ entity 26 goes to a reordering queue 27, which assigns the TBSs to reordering buffers 28A-28D based upon their priority. The TBSs are reordered and presented to a de-assembly unit 29 which dissembles the TBSs into one or more RLC PDUs, which are then forwarded for further processing by the RLC layer 11. In the RLC layer 11, RLC reception buffers are utilized to re-sequence any RLC PDUs that are not in sequence.

Referring to FIG. 3, an example of the use of buffers by AM entities 30 within the RLC layer 11 is shown. Starting at the bottom of FIG. 3, incoming data 31 from the MAC layer 13 is applied to the first several stages of the RLC layer 11. The incoming data 31 is demultiplexed in the demultiplexer 33 and routed by the router 35 to the deciphering unit 37 where the RLC PDUs are deciphered, (if ciphering is configured).

The data is then sent to the RLC reception buffers and data retransmission unit 39 for transmission management. The data retransmission unit looks at the sequence numbers (SNs) which are attached to the header of each RLC PDU as the RLC PDUs are generated. If one or more RLC PDUs are missing, the data retransmission unit utilizes an error handling routine to send an RLC status report and request that the appropriate RLC PDU(s) be retransmitted. If all the SNs were correctly received, the error handling routine signals a successful transmission.

Once a successful transmission of RLC PDUs has been received, header information is removed and any piggyback information is extracted by a post buffer entity 43. A reassembly entity 45 then reassembles the RLC PDUs into RLC service data units (SDUs). Each RLC PDU waits at the reception buffer 39 until all RLC PDUs of the RLC SDU are completely received. Once all RLC PDUs are received and are correct, the data is passed up to the acknowledge mode— subsystem application part (AM-SAP) 47 and eventually passed to the non-access stratum (NAS) 49, which are the upper layers of the WTRU protocol stack.

As data flows from the Node B 17 to the WTRU 5, there is a transmission-window mechanism to control the transmission rate of the RLC PDUs. The sender only allows a certain number of PDUs to be transmitted between the peer RLC entities. This number is always less than the RLC transmission window size and is known by both RLC entities.

The RLC transmission window size can be adjusted through control signaling. At any instant, reconfiguration of the RLC transmission window size by the RLC sender should take into account the total buffer size allocated for both the MAC reordering buffers and the RLC reordering buffers.

According to the current 3GPP standard for High Speed Downlink Packet Access (HSDPA), the WTRU will signal the UTRAN to configure transmission window sizes in order to prevent data loss. There are several factors which are considered to generate an appropriate signal for the UTRAN. If the WTRU does not employ high speed downlink shared channel (HS-DSCH) services, the total buffer size is defined as the maximum total buffer size across all RLC AM entities supported by the WTRU. For HS-DSCH, which occurs only on the downlink, the total buffer size is defined as the maximum total buffer size across all MAC reordering entities and all RLC AM entities supported by the WTRU. Table 1 is a summary of the elements that are taken into account when determining the maximum buffer size.

TABLE 1

MAXIMUM BUFFER SIZE

| WITHOUT HS-DSCH | WITH HS-DSCH |
|---|---|
| MAX TOTAL BUFFER SIZE ACROSS ALL RLC AM ENTITIES | MAX TOTAL BUFFER SIZE ACROSS ALL RLC AM ENTITIES + ALL MAC REORDERING BUFFERS |

Equation 1 is utilized to derive a maximum buffer size of a WTRU:

$$\sum_{i=1}^{\#RLC\_AM\_entities} Transmission\_window\_size_i *$$
$$(UL\_RLC\_PDU\text{-}size_i - RLC\_Header\_size) +$$
$$\sum_{i=1}^{\#RLC\_AM\_entities} Receiving\_window\_size_i *$$
$$(DL\_RLC\_PDU\text{-}size_i - RLC\_Header\_size) +$$
$$\sum_{j=1}^{\#MAC\text{-}hs\_reodering\_entities} MAC\_reodering\_entity\_buffer\_size_j \leq$$
$$Total\_buffer\_size$$

Equation (1)

where Transmission_window_size is the size of a particular entity (i's) transmission window size; $UL\_RLC\_PDU\_size_i$ is the size of a particular entity (i's) UL RLC PDU buffer; RLC_Header_size is the size of a particular entity (i's) RLC header; Receiving_window_size is the size of a particular entity (i's) reception transmission window size; $DL\_RLC\_PDU\_size_i$ is the size of a particular entity (i's) DL RLC PDU buffer; RLC_Header_size is the size of a particular entity (i's) RLC header; and MAC_reordering_entity_buffer_size is the size of a particular entity (j's) MAC reordering buffer.

For example, if a WTRU has two UL RLC PDU buffers, two DL RLC PDU buffers and three MAC reordering buffers, and all of the buffers have a fixed size of 5 kilobytes (kb) and a fixed header size of 1 kb, from Equation 1 it can be determined that the total buffer size be at least 31 kilobytes.

In the context of RLC transmission, the buffer (or memory) installed within a WTRU dictates the RLC window size. There is a tradeoff between memory requirements and performance. In general, a larger memory permits a large window size which leads to more robust performance, but greatly increases the manufacturing cost of the WTRU. A smaller memory can only support a reduced window size. If the window size is too small, there is a greater tendency for the transmitting side to be forced to suspend new transmissions while waiting for errors to be corrected. This both reduces the effective data rate and increases the latency of the overall transaction.

Additionally, there are often separate dedicated memories with specific functions that are dedicated to different layers. This is a very inefficient utilization of hardware.

It would be desirable to have an efficient method for allocating memory for different functions while still maintaining high effective data rates.

SUMMARY

The present invention allows for effective sharing of the memory of a wireless transmit receive unit. The memory is shared among various buffers of different entities to reduce overall memory requirements while maintaining high effective data rates.

BRIEF DESCRIPTION OF THE DRAWINGS

FIG. 7 is a block diagram of a WTRU made in accordance with the present invention.

DETAILED DESCRIPTION OF THE PREFERRED EMBODIMENTS

Figure 1:
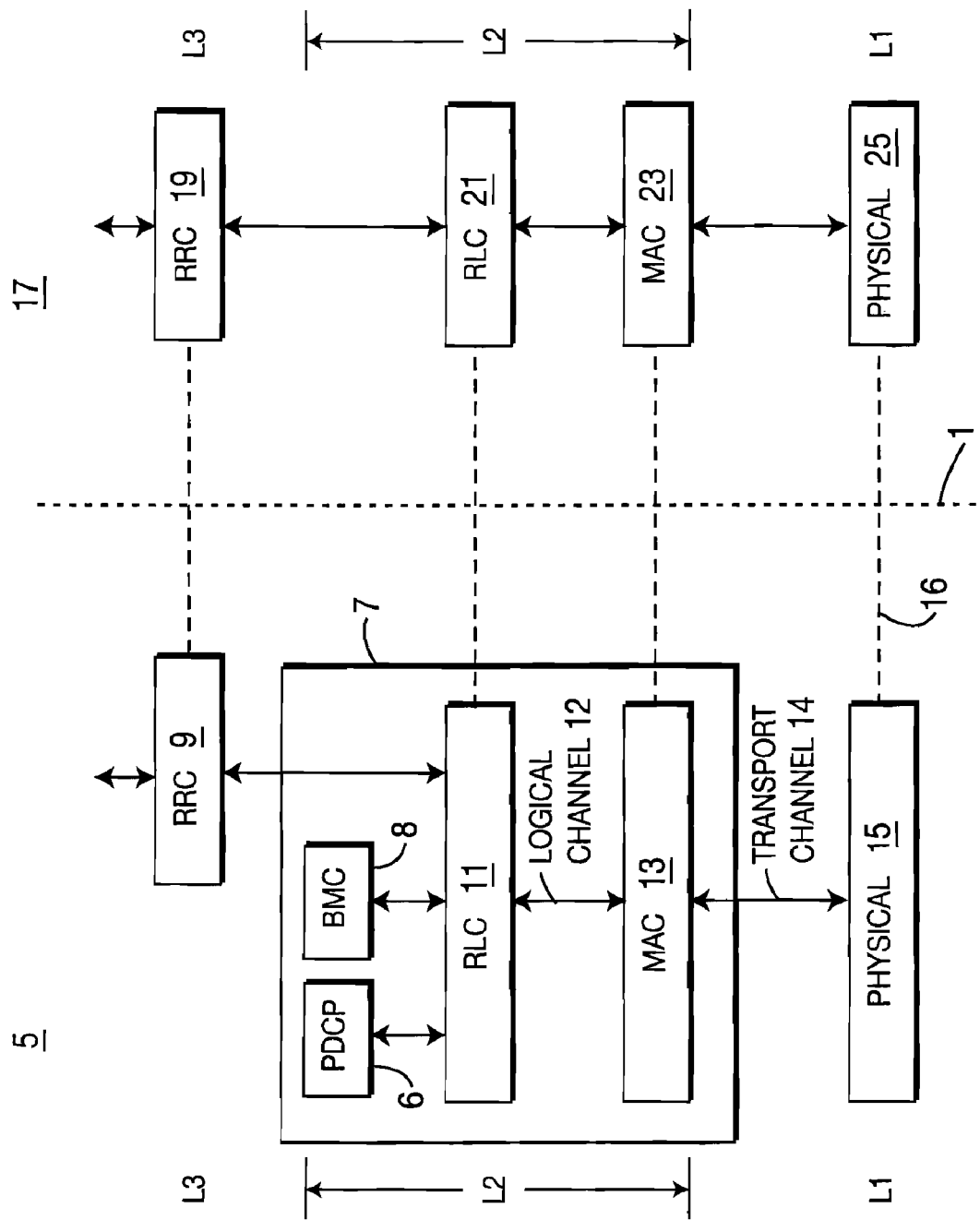
FIG. 1 is a block diagram of a multi-layer peer-to-peer communication protocol in a WTRU and a Node B in accordance with the prior art.
Figure 2:
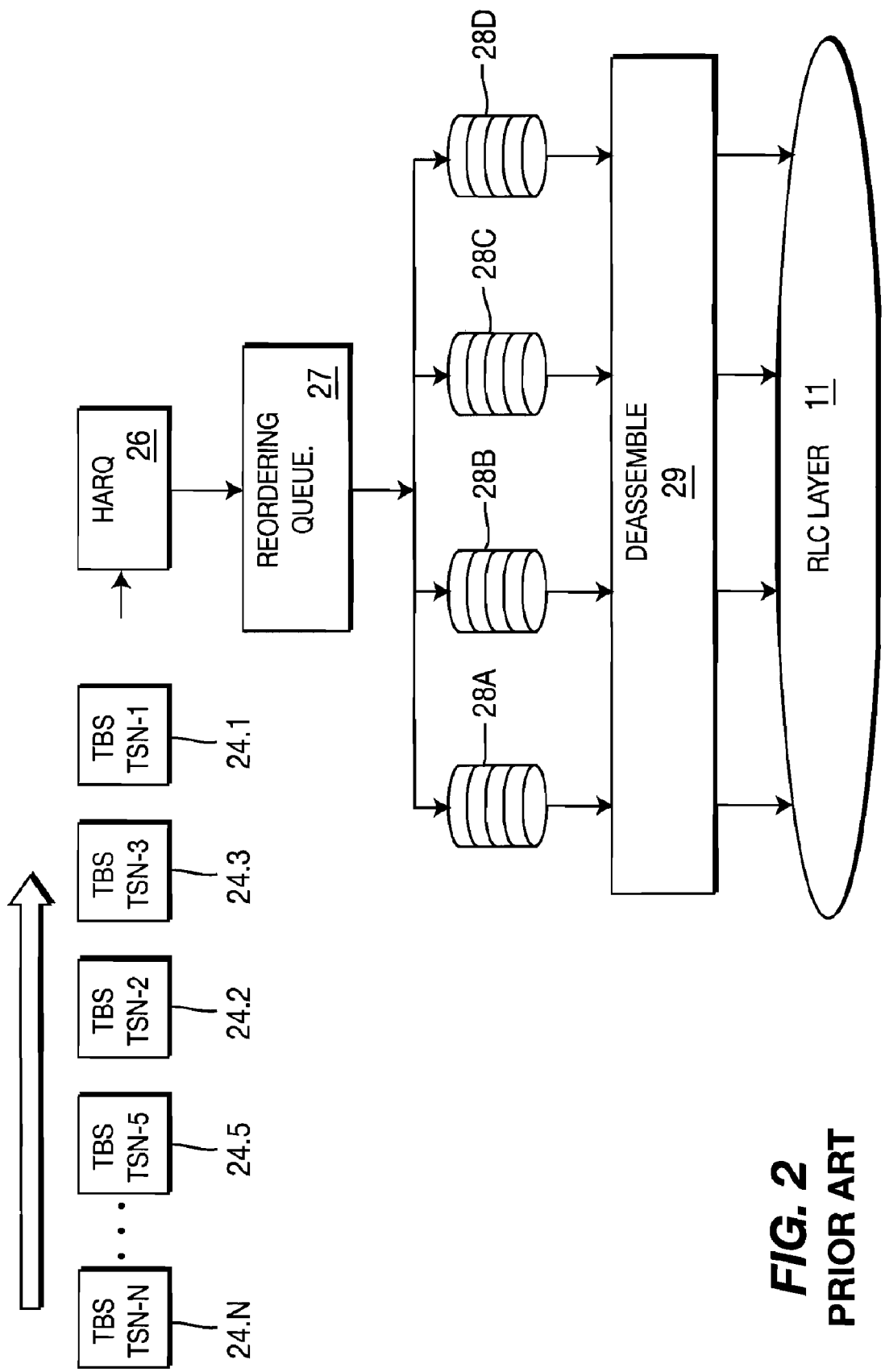
FIG. 2 is a block diagram of the H-ARQ process in accordance with the prior art.
Figure 3:
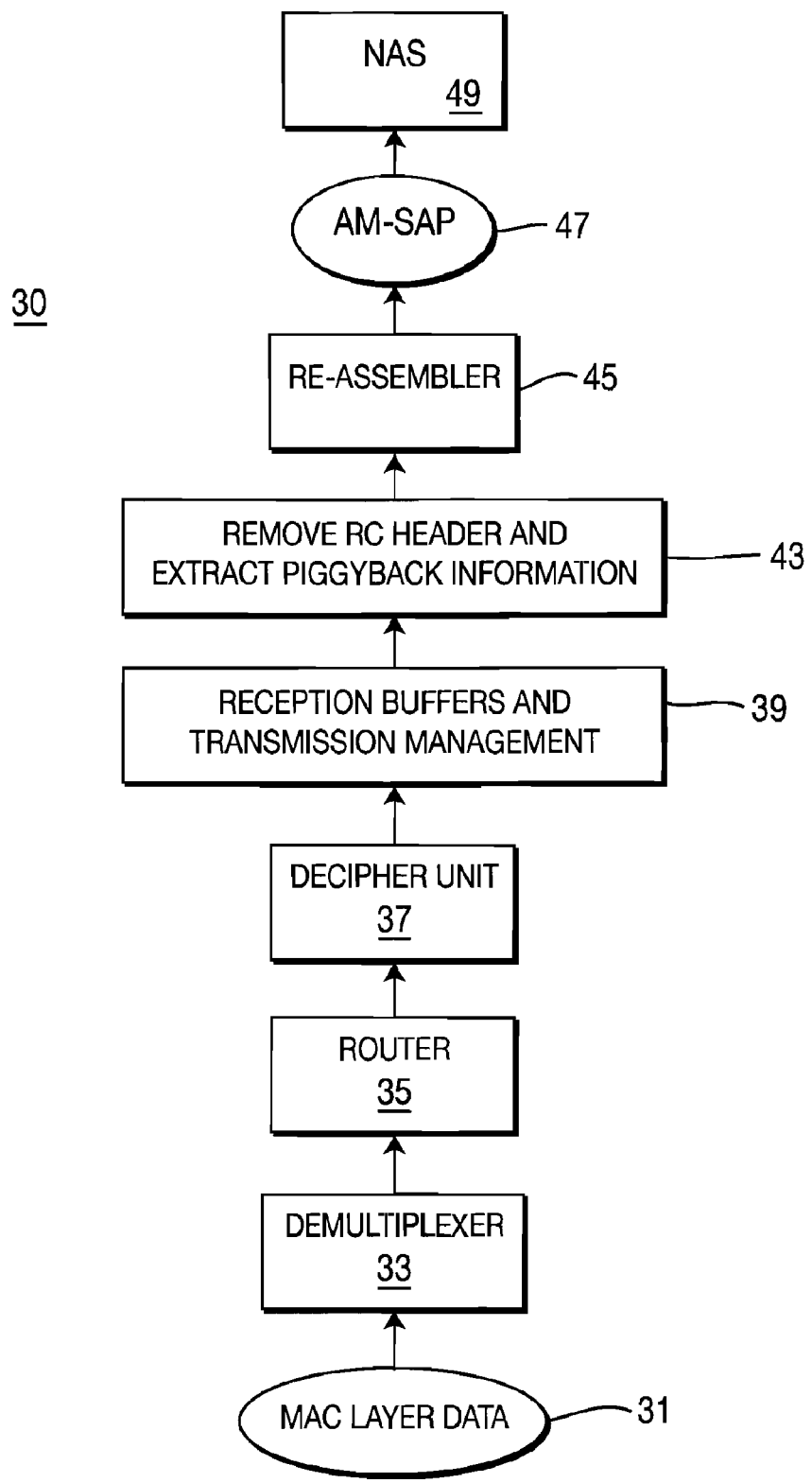
FIG. 3 is a block diagram of the RLC process in accordance with the prior art.

The present invention will be described with reference to the drawing figures wherein like numerals represent like elements throughout. The invention is applicable to frequency division duplex (FDD) as well as time division duplex (TDD) modes of a 3GPP communication system. The present invention is also applicable to any wireless or wired communication system. Although the preferred embodiments are described in conjunction with a 3GPP system utilizing the TDD mode, this is only an example and the present invention should not be construed to be so limited.

As used hereinafter, the term wireless transmit receive unit (WTRU) includes but is not limited to mobile units, user equipment, mobile stations, fixed or mobile subscriber units, pagers, or any other type of device capable of being operated in a wireless environment. When referred to hereafter, a base station includes but is not limited to a Node-B, site controller, access point or other interfacing device in a wireless environment.

As discussed in the background section, the WTRU signals its current buffer size. Under the memory sharing scheme of the present invention, as will be explained in detail hereinafter, the total buffer size signaled by the WTRU for all the combined RLC reception buffers and MAC reordering buffers can be larger than the actual available buffer size. Although the WTRU signals the effective sum of multiple buffers as if they were physically separate, the invention functionally permits each individual buffer to be its required size when needed, while maintaining the size of the actual physical memory less than the sum of the multiple components due to the inventive memory reuse scheme.

The RLC layer configures the RLC transmission window size such that Equation 1 is always satisfied, whereby the total_buffer size of Equation 1 is the size signaled by the WTRU.

At any moment in time, the total amount of data between RLC and MAC layer entities is limited to the sum of all combined RLC reception window sizes. For instance, the elements that are found within the RLC layer and the MAC layer pathways are the RLC PDUs in the RLC reception buffers and the RLC PDUs encapsulated in the MAC PDUs in their associated MAC reordering buffers. Therefore, the combined memory requirement for all the MAC reordering buffers and the RLC reception buffers are bound only by the memory required for all RLC receiving windows. The WTRU only has to allocate enough memory to accommodate the RLC receiving windows, even though a larger total buffer size has been requested by the UTRAN.

The present invention permits sharing of memory between the RLC reception buffers and the MAC reordering buffers so that there is no need to specifically allocate separate independent physical memories to support both buffering requirements. Under the memory sharing scheme of the present invention, Equation (2) is utilized to derive a maximum buffer size of the WTRU, which should be less than the buffer size required by Equation (1). Even if the WTRU signals the actual implemented buffer size, the RLC transmission window is configured such that Equation (2) is satisfied, since the size of the buffer determined in Equation (2) is all that is theoretically required and the data stored in the MAC by Equation (2). In short, even if the WTRU signals the value according to Equation (1), the maximum buffer size is the reduced amount of memory according to Equation (2):

$$\sum_{i=1}^{\#RLC\_AM\_entitiies} Transmission\_window\_size_i *$$
$$(UL\_RLC\_PDU\text{-}size_i - RLC\_Header\_size) +$$
$$\sum_{i=1}^{\#RLC\_AM\_entitiies} Receiving\_window\_size_i *$$
$$(DL\_RLC\_PDU\text{-}size_i - RLC\_Header\_size) \le$$
$$Total\_buffer\_size;$$

Equation (2)

where Transmission_window_size is the size of a particular entity (i's) transmission window size; $UL\_RLC\_PDU\_size_i$ is the size of a particular entity (i's) UL RLC PDU buffer; RLC_Header_size is the size of a particular entity (i's) RLC header; Receiving_window_size is the size of a particular entity (i's) reception transmission window size; and $DL\_RLC\_PDU\_size_i$ is the size of a particular entity (i's) DL RLC PDU buffer.

Figure 4:
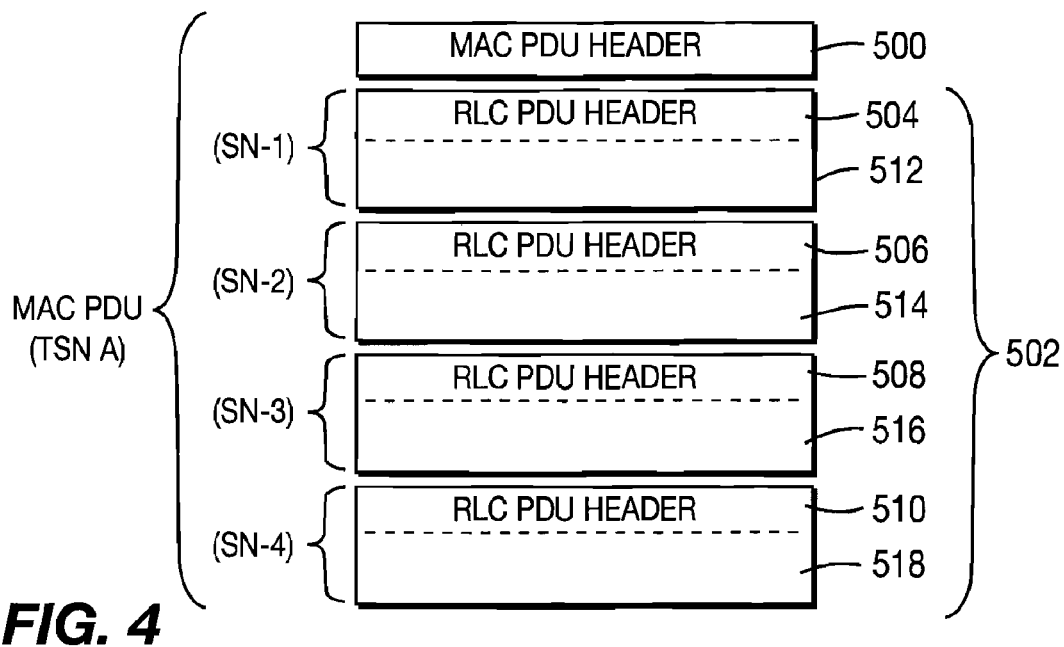
FIG. 4 is a block diagram of a MAC PDU including several RLC PDUs.

It should be noted by those skilled in the art that the foregoing description refers to both MAC PDUs and RLC PDUs. MAC PDUs are identified by transmission sequence numbers (TSNs) and RLC PDUs are identified by sequence numbers (SNs). A MAC PDU may contain more than one RLC PDU. For example, referring to FIG. 4, a MAC PDU is identified as TSN A and comprises a MAC PDU header 500 and a payload 502. The payload 502 comprises one or more RLC PDUs identified by their sequence numbers SN1, SN2, SN3 and SN4. Each RLC PDU SN1-SN4 comprises a header 504, 506, 508, 510 and a payload 512, 514, 516, 518, respectfully.

Figure 5:
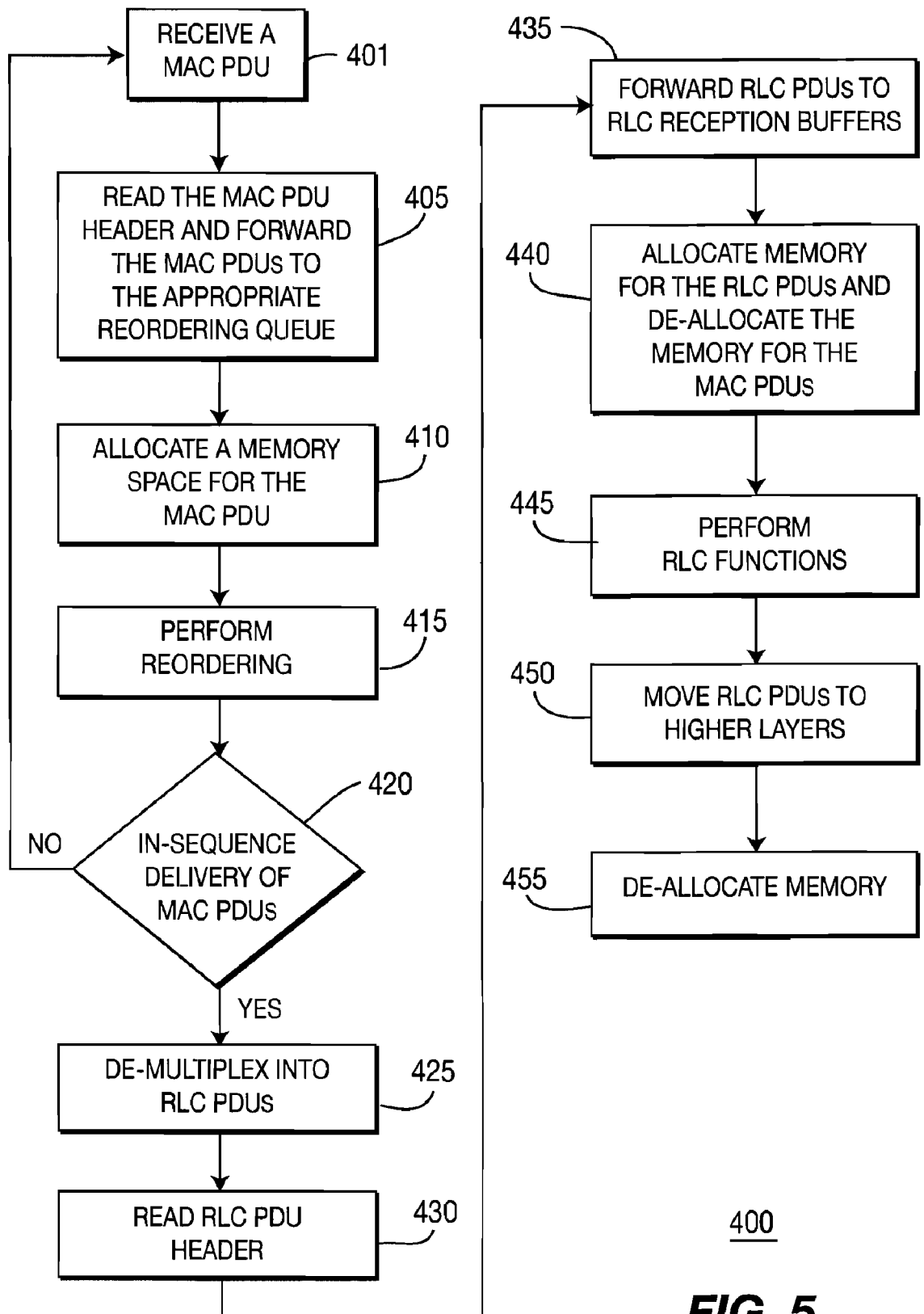
FIG. 5 is a flow diagram of a preferred embodiment of the present invention.

Referring to FIG. 5, a flow diagram of the preferred method 400 of the present invention is shown. A MAC PDU is first received (step 401). The header of the MAC PDU is read for determining the priority of the MAC PDU, and an appropriate reordering buffer is chosen (step 405). A memory space is allocated to each MAC PDU (step 410). Reordering is then performed at step 415 to place the MAC PDUs in the proper order. One example of such a reordering function is the reordering which supports the H-ARQ process.

A determination is then made of whether the MAC PDUs are in sequential order (step 420), (i.e., to determine whether there are any missing PDUs). If the MAC PDUs are not in sequential order, the MAC PDUs are not passed on for further processing and the method 400 returns to step 401 to process the next MAC PDU and to determine whether it is the missing MAC PDU.

When it has been determined the MAC PDUs are received in sequential order, the MAC PDUs are de-multiplexed into RLC PDUs (step 425). The RLC PDU headers are read (step 430) and forwarded to the appropriate RLC reception buffers (step 435). Memory is allocated for each new RLC PDU, while the memory for the processed MAC PDU is simultaneously de-allocated (step 440). The RLC layer will then perform RLC functions to the RLC PDUs (step 445) that are well known to those of skill in the art. For example, such functions may include, but are not limited to, segmentation and reassembly; concatenation; padding; transfer of user data; error correction; duplicate detection; flow control; sequence number check; protocol error detection and recovery; ciphering; and SDU discarding.

After the RLC functions on the RLC PDUs are performed (step 445), the RLC PDUs are forwarded to higher layers (step 450) and their associated memory is de-allocated (step 455).

The prior art schemes utilized static memory allocation, where the MAC PDUs and the RLC PDUs were not stored in the same memory space. In contrast, with the present invention, since memory is first utilized to operate upon a particular MAC PDU, and the same portion of memory is utilized to operate upon the corresponding RLC PDUs it is not necessary to have two separate memories, or two separate portions of the same memory. With the present invention, as the MAC PDUs are de-multiplexed into one or more RLC PDUs and memory is allocated for each newly created RLC PDU, the memory where the MAC PDU existed is de-allocated.

Figure 6:
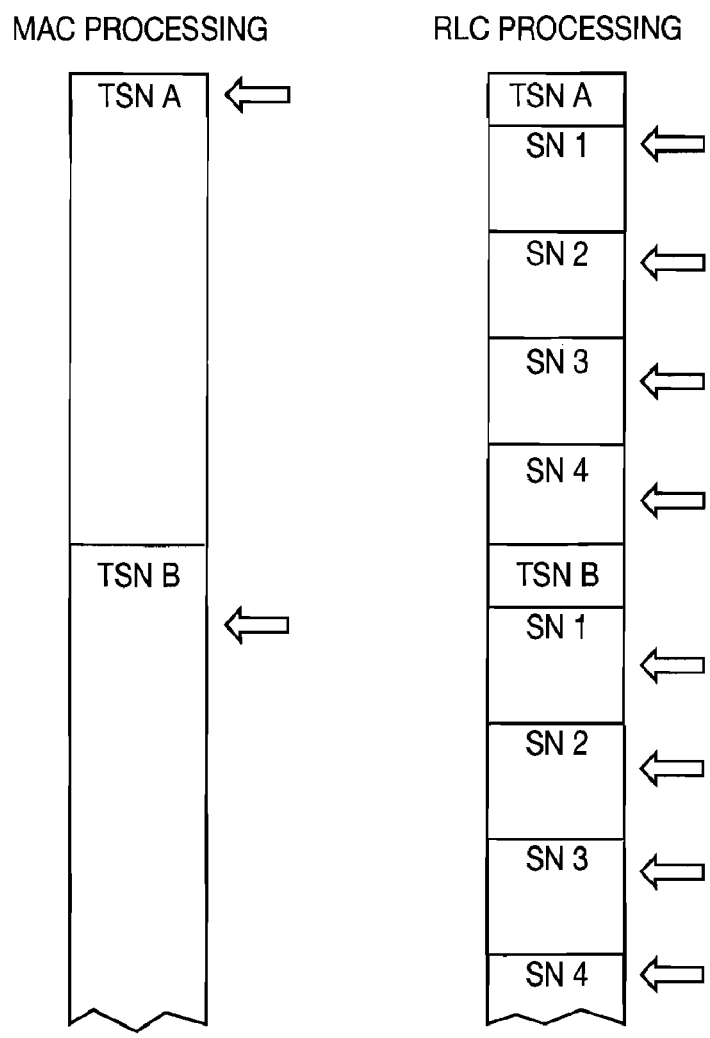
FIG. 6 is a block diagram of the efficient allocation of memory in accordance with the present invention.

The process of allocating a portion of memory for the RLC processing while de-allocating a corresponding portion of memory for the MAC processing does not require physically reading the data from one memory location and rewriting it to another memory location. As shown in FIG. 6, when MAC PDUs, (for example as identified by TSNs A and B), are stored in memory, the TSNs are the pointers (graphically shown as arrows), in memory which are used while MAC processing is being performed. However, when RLC processing is performed on the RLC PDUs, their corresponding SNs, (for example as identified by SNs SN1, SN2, SN3 and SN4), are used as the pointers. The two columns shown in FIG. 6 are the same portion of memory; they are merely accessed differently and at different times by the MAC and RLC processes. Thus, "allocation" of a portion of memory for a MAC PDU includes storing the MAC PDU in memory and identifying the MAC PDU by its TSN. Additionally, "re-allocation" of the memory for RLC PDUs is performed by utilizing a different pointer (i.e., the SNs). Thus, the TSNs are utilized as the pointer for MAC layer processing and the SNs are used as the pointers for RLC layer processing. The use of different types of pointers identifies the change in status from MAC layer processing to RLC layer processing, while keeping the actual data in the same memory location. This substantially reduces the memory requirements of the WTRU and therefore greatly reduces costs.

In an alternative embodiment of the present invention, a "tag" or a field identifier identifies the change in status from MAC layer processing to RLC layer processing. This also results in keeping the actual data in the same memory location and provides the same reduction in memory costs.

FIG. 7 is a system 600 in accordance with the present invention for supporting sharing of a common memory 606 by multiple reordering entities. The system includes a receiving module 601, a disassembly module 605 and a memory

606. The memory 606 is graphically illustrated as a plurality of reordering queues 610a-610n and a plurality of reception buffers 615a-615n. However, as was described with reference to FIG. 6, the PDUs are stored once in the memory 606. Thus, transfer of the processing of the data from MAC layer processing in the reordering queues 610a-610n to RLC layer processing in the RLC reception buffers 615a-615m is performed by using different pointers for MAC and RLC processing, rather than physically relocating the PDUs to different portions of memory.

In this embodiment, the MAC PDUs received in the receiving module 601, are disassembled into RLC PDUs in the disassembly module 605 and forwarded to the memory 606. Each MAC-related TSN and its associated RLC-related SNs are also stored in the memory 606 along with the payload, (as was shown and described with reference to FIG. 6). Therefore, corresponding to each block of data there is an associated TSN and an associated SN.

Although MAC layer processing is performed first, the memory 606 is allocated on a per-RLC PDU basis. Data is stored in the memory in a specific location for a specific RLC PDU. When disassembly is performed, one MAC PDU contains one or more RLC PDUs. As a result, several blocks of data may have the same TSN but different SNs. This is because each reordering queue 610a-610n potentially services many RLC instances (not shown), which will de-allocate the RLC reception buffers 615a-615m independently of each other. Therefore, if memory allocated on an RLC PDU basis by disassembling first before in-sequence processing (i.e., reordering queues), then the de-allocations can be handled by each RLC instance.

As graphically shown in FIG. 7, one reordering queue 610a-610n may service several independent RLC reception buffers 615a-615m. This is because each reordering queue 610a-610n is associated with a specific data "priority class", whereas multiple RLC reception buffers 615a-615m may have the same priority class and may therefore serviced by a single reordering queue 610a-610n.

At the reordering queue 610a-610n, the RLC PDUs are reordered in accordance with their TSNs by the MAC reordering function and placed into sequential order. The RLC reception buffers 615a-615m, utilizing the SNs, perform RLC layer processing. When the RLC layer processing in the RLC reception buffers 615a-615m is complete, the data is forwarded to higher layers 625 for processing. The memory is then de-allocated when the RLC RDUs are forwarded for processing by higher layers 625.

The portion of memory 606 that is originally allocated for each MAC PDU does not change from the time the PDUs is received by the MAC layer until the time it is forwarded to the NAS. What does change is the status of the data. The present invention uses the TSN as pointer while the status of the data is a MAC PDU, and the SN as a pointer while the status of the data is an RLC PDU. MAC functions (primarily reordering) and RLC functions (primarily assembling and examining missed RLC PDUs and out-of-sequence delivery) are performed on the TSN and SN pointers, respectively, rather than ordering and moving the data payloads themselves.

The present invention is an improvement over the prior art schemes since shared memory is virtually allocated/de-allocated by MAC and RLC processes, while keeping the physical memory location the same. The greater maximum amount of memory required by prior art schemes for both the RLC reception buffers and MAC reordering queues is avoided.

Although the present invention has been described in detail, it is to be understood that the invention is not limited thereto, and that various changes can be made therein without departing from the spirit and scope of the invention, which is defined by the attached claims.

What is claimed is:

1. A method for sharing memory implemented in a wireless transmit/receive unit (WTRU), the method comprising:
    determining a size of a combined buffer for radio link control (RLC) entities and medium access control (MAC) reordering entities;
    transmitting an indication of the size of the combined buffer for the RLC entities and the MAC reordering entities; and
    processing MAC protocol data units (PDUs) and RLC PDUs while sharing a same memory space as the combined buffer for processing the RLC PDUs and the MAC PDUs between the RLC entities and the MAC reordering entities, wherein each MAC PDU includes at least one RLC PDU and the RLC PDUs are not reallocated to a different memory space in the combined buffer as the RLC PDUs are disassembled from the MAC PDUs.

2. The method of claim 1 wherein a transmission sequence number (TSN) is used for identifying the MAC PDUs stored in the combined buffer, and a sequence number (SN) is used for identifying the RLC PDUs stored in the combined buffer.

3. A wireless transmit/receive unit (WTRU) comprising:
    a memory having a capacity, a combined buffer in the memory configured to store medium access control (MAC) protocol data units (PDUs) and radio link control (RLC) PDUs, wherein the RLC PDUs are associated with RLC entities and the MAC PDUs are associated with MAC reordering entities, and wherein a same memory space as the combined buffer is shared for processing the RLC PDUs and the MAC PDUs between the RLC entities and the MAC reordering entities;
    a processor configured to determine a size of the combined buffer for the RLC entities and the MAC reordering entities and process the MAC PDUs and the RLC PDUs; and
    a transmitter configured to transmit an indication of the size of the combined buffer for the RLC entities and the MAC reordering entities, wherein each MAC PDU includes at least one RLC PDU and the RLC PDUs are not reallocated to a different memory space in the combined buffer as the RLC PDUs are disassembled from the MAC PDUs.

4. The WTRU of claim 3 wherein a transmission sequence number (TSN) is used for identifying the MAC PDUs stored in the combined buffer, and a sequence number (SN) is used for identifying the RLC PDUs stored in the combined buffer.

* * * * *